(12) United States Patent
Garcia-Saavedra et al.

(10) Patent No.: US 12,536,038 B2
(45) Date of Patent: Jan. 27, 2026

(54) VIRTUALIZED RADIO ACCESS POINT, VRAP, AND METHOD OF OPERATING THE SAME

(71) Applicant: NEC LABORATORIES EUROPE GMBH, Heidelberg (DE)

(72) Inventors: Andres Garcia-Saavedra, Heidelberg (DE); Xavier Costa-Perez, Heidelberg (DE); Marco Gramaglia, Leganes (ES); Albert Banchs, Leganes (ES)

(73) Assignee: NEC CORPORATION, Tokyo (JP)

( * ) Notice: Subject to any disclaimer, the term of this patent is extended or adjusted under 35 U.S.C. 154(b) by 364 days.

(21) Appl. No.: 18/251,402

(22) PCT Filed: Nov. 23, 2020

(86) PCT No.: PCT/EP2020/083054
§ 371 (c)(1),
(2) Date: May 2, 2023

(87) PCT Pub. No.: WO2022/096140
PCT Pub. Date: May 12, 2022

(65) Prior Publication Data
US 2024/0004704 A1 Jan. 4, 2024

(30) Foreign Application Priority Data
Nov. 5, 2020 (EP) .................................... 20205994

(51) Int. Cl.
*H04W 48/18* (2009.01)
*G06F 9/48* (2006.01)
*H04W 88/08* (2009.01)

(52) U.S. Cl.
CPC ........... *G06F 9/4887* (2013.01); *H04W 88/08* (2013.01)

(58) Field of Classification Search
CPC ............................. G06F 9/4887; H04W 88/08
USPC ....................................................... 455/414.1
See application file for complete search history.

(56) References Cited

U.S. PATENT DOCUMENTS

2020/0183741 A1    6/2020  Tang
2020/0296741 A1*   9/2020  Ayala Romero .... H04W 72/535

OTHER PUBLICATIONS

Venkataramani, Vanchinathan et al.; "SPECTRUM: A Software-defined Predictable Many-core Architecture for LTE/5G Baseband Processing"; ACM Transactions on Embedded Computing Systems; Sep. 26, 2020; pp. 1-28; vol. 19, No. 5; XP058491719; ACM Publications; New York, NY, USA.

* cited by examiner

*Primary Examiner* — Tanmay K Shah
(74) *Attorney, Agent, or Firm* — Leydig, Voit & Mayer, Ltd.

(57) ABSTRACT

A method for operating a virtualized radio access point (vRAP) includes: providing a digital signal processor (DSP) pipeline including a number of DSP workers for execution of a plurality of threads of a physical layer (PHY) of the vRAP, wherein a thread of the plurality of threads includes a sequence of processing tasks, including at least one of processing an uplink, UL, subframe, performing UL and downlink, DL, resource scheduling and processing a DL subframe; and interlinking at least three dedicated DSP workers of the DSP pipeline in such a way that different processing tasks of the thread are executed in parallel.

18 Claims, 9 Drawing Sheets

VIRTUALIZED RADIO ACCESS POINT, VRAP, AND METHOD OF OPERATING THE SAME

CROSS REFERENCE TO RELATED APPLICATIONS

This application is a U.S. National Phase application under 35 U.S.C. § 371 of International Application No. PCT/EP2020/083054, filed on Nov. 23, 2020, and claims benefit to European Patent Application No. EP 20205994.5, filed on Nov. 5, 2020. The International Application was published in English on May 12, 2022 as WO 2022/096140 A1 under PCT Article 21(2).

FIELD

The present invention relates to a virtualized radio access point, vRAP, and to a method of operating the same.

BACKGROUND

The virtualization of radio access networks (RANs), based hitherto on monolithic appliances over ASICs (Application-Specific Integrated Circuit), will become the spearhead of next-generation mobile systems beyond 5G. For a few years now, initiatives such as the carrier-led O-RAN alliance or Rakuten's greenfield deployment in Japan have spurred the market—and so the research community—to find novel solutions that import the flexibility and cost-efficiency of network function virtualization (NFV) into the very far edge of mobile networks.

Compared to purpose-built RAN hardware, virtualized RANs (vRANs) pose several advantages: (i) Leverage off-the-shelf based platforms, which are more cost-efficient over the long-term due to economies of scale; (ii) hardware harmonization across the network, which helps reduce costs; (iii) seamless integration of cloud technologies, lowering barriers for competition and innovation; (iv) healthy DevOps practices, such as continuous delivery, traditionally alien to the RAN arena. The key issue is ultimately to build vRANs that perform as close as possible to their hardware-based counterparts in cloud environments at the edge.

Figure 1:
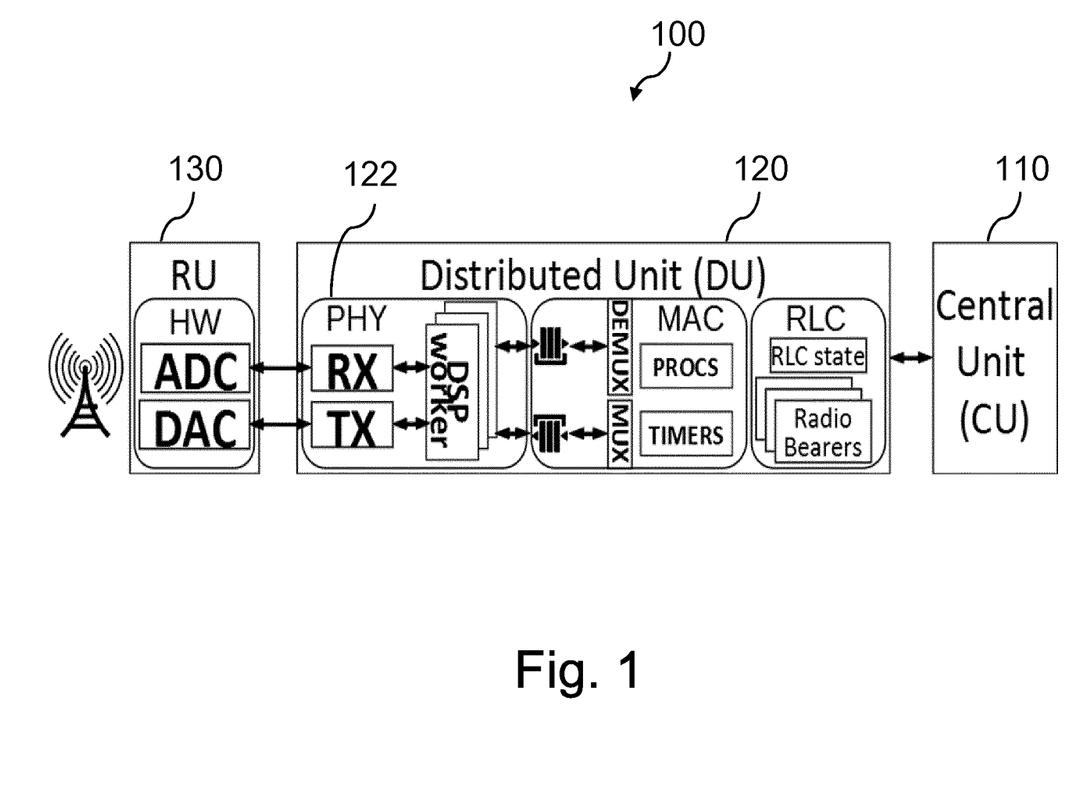
FIG. 1 is a schematic view illustrating radio access point in a 5G RAN architecture.

FIG. 1 schematically illustrates the structure of a radio access point 100 (RAP) in a 5G RAN architecture. Regardless of the different terminology used for the radio access point—eNodeB (eNB) in 4G LTE or gNodeB (gNB) in 5G—the term RAP, or vRAP for its virtualized counterpart, will be used in the present disclosure as an abstraction. As depicted in FIG. 1, 5G splits each RAP 100 into a central unit 110 (CU), hosting the higher layers of the stack; a distributed unit 120 (DU), hosting the physical layer 122 (PHY); and a radio unit 130 (RU), hosting basic radio functions such as amplification or analog-to-digital conversion (ADC). This split enables resource pooling and fosters virtualization. However, while CU virtualization is already a reality in production systems, the PHY 122 is substantially more complex to virtualize without compromising flexibility and cost-efficiency because they require fast and predictable computation.

Cloud platforms, comprised of pools of shared computing resources (CPUs, mostly, but also GPUs, FPGAs and other task accelerators), represent an overly harsh environment for DUs, like DU 120 of FIG. 1, because cloud platforms compromise the predictability provided by dedicated computing platforms for higher flexibility and cost-efficiency. Indeed, as will be shown next, current virtual PHY (vPHY) architectures are not suitable for such scenarios. Consequently, the main challenge for DU virtualization is to design a vPHY processor that uses multi-core computing resources efficiently so as to preserve carrier-grade performance and attain reliability in cloud environments at the edge.

Figure 2:
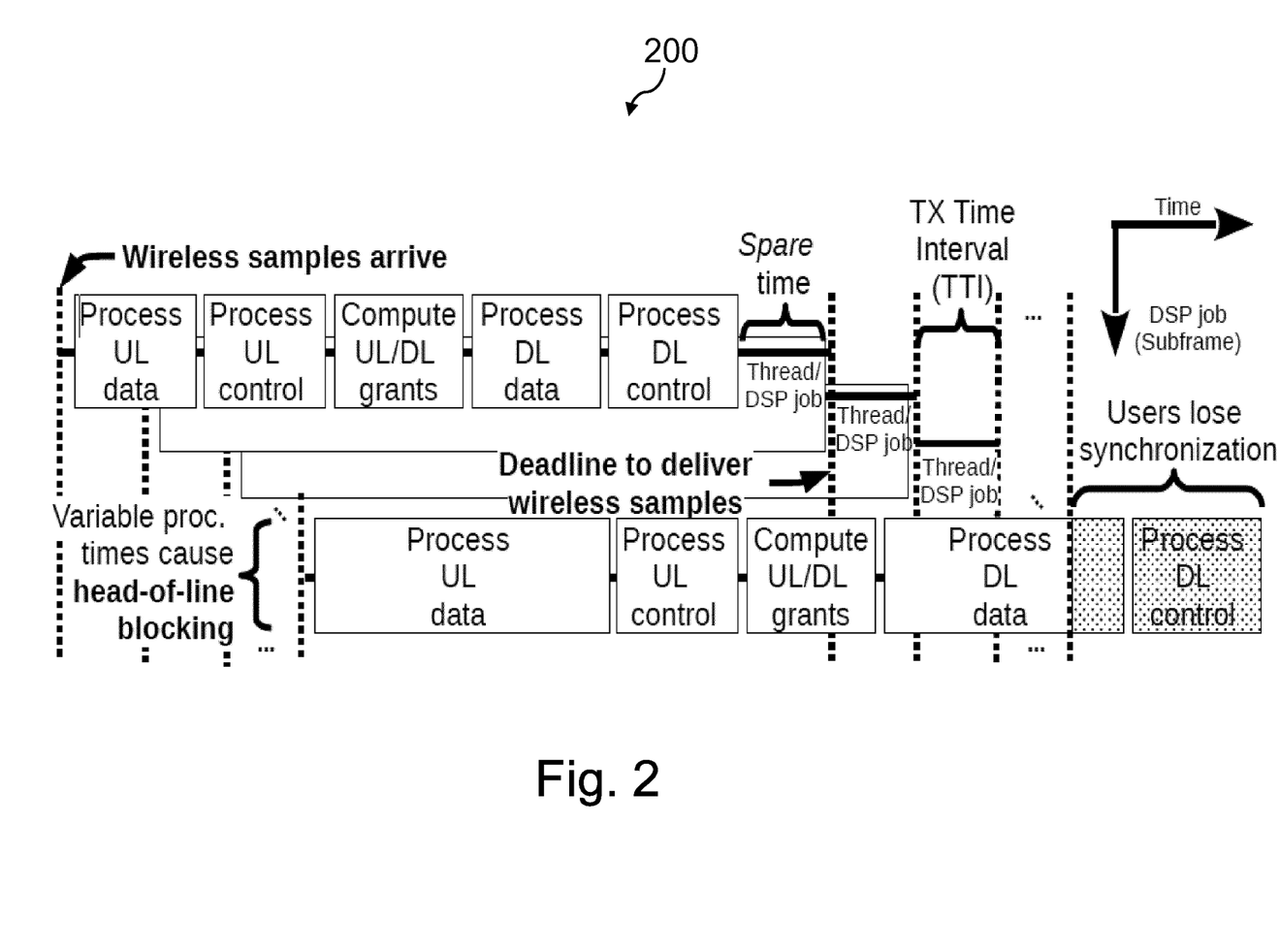
FIG. 2 is a schematic view illustrating a baseline pipelined digital signal processor (DSP)

FIG. 2 schematically illustrates the operation of a pipelined digital signal processor 200 (DSP) for virtualized PHYs (vPHYs) used commonly over general-purpose CPUs. Every transmission time interval (TTI, 1 ms), a worker executes a job comprised of a sequence of tasks: (i) processing an uplink (UL) subframe, (ii) scheduling uplink and downlink (DL) data, and (iii) compiling a downlink subframe. As is shown in FIG. 2, a set of workers executes jobs in a pipeline of parallel threads to maximize the chances the DSP 200 completes a job every TTI. However, albeit the efficiency of this design has been sufficient for much research work, it is not for carrier-grade performance and reliability. Basically, this is the result of three main sources of inefficiency:

1. The PHY layer has tight time deadlines to process certain DSP tasks, which constraints the highest pipeline depth (to usually 3 parallel workers);
2. There are inter-task dependencies that prevent parallelization (for instance, the MAC scheduler needs feedback from UL tasks, DL tasks need MAC grants, etc.); and
3. The computing time of data processing tasks depends on the users' behavior, which yields unreliability and head-of-line blocking.

The latter is shown at the bottom of FIG. 2, which illustrates an example where data processing tasks take a long time. As a consequence, the execution of the remaining tasks gets delayed (head-of-line blocking), which plays havoc with the ability of the vPHY processor to deliver a DSP job every TTI if the pipeline depth is not sufficiently high (unreliability).

The obvious approaches to combat these challenges, namely, hardware acceleration and over dimension, cancel out the very reasons that make virtualization appealing for the RAN, which are flexibility and cost-efficiency. Moreover, even if hardware acceleration is used a la cloud to offload some PHY tasks (such as forward error correction), congestion in the abstraction layer brokering access to the accelerators would result in similar head-of-line blocking issues.

SUMMARY

In an embodiment, the present disclosure provides a method of operating a virtualized radio access point (vRAP), the method comprising: providing a digital signal processor (DSP) pipeline including a number of DSP workers for execution of a plurality of threads of a physical layer (PHY) of the vRAP, wherein a thread of the plurality of threads comprises a sequence of processing tasks, including at least one of processing an uplink, UL, subframe, performing UL and downlink, DL, resource scheduling and processing a DL subframe; and interlinking at least three dedicated DSP workers of the DSP pipeline in such a way that different processing tasks of the thread are executed in parallel.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention improves and further develops a virtualized radio access point, vRAP, and a method of the same in such a way that the solution enables high-performing RAN virtualization onto inexpensive general-purpose CPU fabrics without compromising the advantages of virtualization.

In another embodiment, the present invention provides a method of operating a virtualized radio access point, vRAP, the method comprising providing a digital signal processor, DSP, pipeline including a number of DSP workers for execution of threads of a physical layer, PHY, of the vRAP, wherein a thread comprises a sequence of processing tasks, including at least one of processing an uplink, UL, subframe, performing UL and downlink, DL, resource scheduling and processing a DL subframe; and interlinking at least three dedicated DSP workers of the DSP pipeline in such a way that different processing tasks of a particular thread are executed in parallel.

In another embodiment, the present invention provides a virtualized radio access point, vRAP, comprising a digital signal processor, DSP, pipeline including a number of DSP workers for execution of threads of a physical layer, PHY, of the vRAP, wherein a thread comprises a sequence of processing tasks, including at least one of processing an uplink, UL, subframe, performing UL and downlink, DL, resource scheduling and processing a DL subframe, wherein at least three dedicated DSP workers of the DSP pipeline are interlinked in such a way that different processing tasks of a particular thread are executed in parallel.

According to the invention, it has been recognized that high-performing RAN virtualization onto inexpensive general-purpose CPU fabrics can be achieved by interlinking dedicated DSP workers of the DSP pipeline such that certain data processing tasks of a particular thread can be executed in parallel. Embodiments of the invention allow the deployment of 4G/5G virtual base stations on (low-cost) constrained/shared computing infrastructure, wherein the parallelization of processes allows exploiting multi-core clouds more efficiently. As such, the invention achieves similar performance like FPGAs GPUs, however, with the advantages of lower costs and straightforward virtualization abilities.

Embodiments of the invention provide a cloud-native Radio Access Point having a pipeline design to process 4G LTE and 5G New Radio (NR) physical layer workloads in sub-6 GHz frequency bands over cloud platform. The composition of the pipeline maximizes performance by exploiting multi-core clouds efficiently In addition, it attains high resiliency by guaranteeing a minimum viable subframe (MVSF) irrespective of the computing availability and demand. Hence, the pipeline is particularly suited for constrained (low-cost) computing infrastructure and/or when the infrastructure is heavily shared, inducing variability on the availability of resources.

According to an embodiment it may be provided that the at least three dedicated DSP workers of the DSP pipeline are interlinked in such a way that different processing tasks of a particular thread are executed in parallel without any possibility of blocking each other. In other words, the different processing tasks of a particular thread are distributed among the dedicated DSP worker in such a way that each DSP worker can execute its own processing tasks without blocking (and without being blocked by) any of the other DSP workers executing processing tasks of the same thread.

According to an embodiment it may be provided that the at least three interlinked dedicated DSP workers include a main DSP worker (due to its functionality herein sometimes denoted DSP architect), a UL data DSP worker and a DL data DSP worker. The DSP architect may be configured to execute a minimum subset of basic data processing tasks to process a received UL subframe, to execute UL-independent data processing tasks to process a corresponding DL subframe and to coordinate the UL data DSP worker and the DL data DSP worker. The minimum subset of tasks may include those tasks that are computationally cheap and roughly deterministic. For instance, the minimum subset of tasks to be executed by the DSP architect may include all data processing tasks of a thread, except for the data processing tasks related to the decoding and encoding of transport blocks. The data processing tasks in charge of decoding transport blocks from PUSCH may be executed by the UL data DSP worker, while the data processing tasks in charge of encoding transport blocks for PDSCH may be executed by the DL data DSP worker.

According to an embodiment, coordinating the interlinked DSP job workers may be performed by dividing standard budget time between transmission intervals TTI n and TTI n+M into two phases, Phase I and Phase 2, determined by a hard time deadline. Dividing the total time budget into two sequential phases may be accompanied by a step of scheduling the data processing tasks of a thread to be executed either within the first or in the second of the two phases, wherein decoding and encoding data processing tasks of the UL data DSP worker and of the DL data DSP worker, respectively, are scheduled to be executed within the first phase. Further, an endpoint of the first phase, Phase I, may be determined based on an estimated processing time incurred with the execution of the data processing tasks scheduled to be executed within the second phase, Phase II, wherein decoding and encoding data processing tasks of the UL data DSP worker and of the DL data DSP worker, respectively, may be terminated at the end of the first phase.

More specifically, according to embodiments Phase I may be implemented as follows: Every TTI (1 ms) received encoded data corresponding to an uplink subframe n are transferred to a DSP architect thread. If PUSCH is received, UL TBs (transport block) are demultiplexed from UCI (UL Control Information) and encoded TBs are buffered for external processing by UL-DSP workers. To this end, new UL-DSP workers are created to process each encoded UL TB (one per worker) in parallel. Once each UL-DSP worker finishes its task, it may send data to the MAC layer and UL-HARQ feedback may be stored in a buffer. Furthermore, PUCCH/UCI, if present, may be processed and base signals (PSS/SSS/PBCH) may be encoded for the corresponding DL subframe SF n+M.

According to an embodiment, temporary DL grants may be computed for the corresponding DL SF n+M and, possibly, SF n+M+1, n+M+2, . . . , which may be used by the DL-DSP workers to encode TBs for PDSCH. These DL grants are only temporary and, in particular, they may be generated with consideration to the availability of computing capacity and availability of data from the MAC layer. The temporary DL grants may be discarded (or confirmed) later on depending on the state of the DL-DSP workers in Phase II.

Upon computing of the temporary DL grants, new DL-DSP workers are created to process each DL transport block (one per worker) in parallel. Once each DL-DSP worker finishes its task, it may store encoded TBs in a buffer. Specifically, the one or more threads of the DL-Data DSP workers in charge of the bulk of PDSCH processing tasks create a multi-thread downlink processing pipeline that uses temporary grants, predicting the availability of computing resources and encoding data proactively for successive subframes, to minimize idle time in the cloud platform. In this way, it is possible to have as many UL-Data DDSP workers as needed, without a pipeline depth limit to exploit multi-core platforms more efficiently.

According to an embodiment, the DSP architect snoozes up until a time $\phi_n := M - \tau$, where $\tau$ is the processing time incurred by Phase II plus transportation ($\delta$ ms), which can be estimated beforehand.

According to embodiments Phase II may be implemented as follows: Phase II starts at time $\phi_n$, as defined above, to finish up DL subframe n+M. To this end, the DSP architect has $\tau - \delta$ ms of the available time budget to perform the following sequence of tasks:

Given the state of the UL-DSP workers, buffer with stored UL-HARQ feedback, and the availability of computing resources, making a prediction as to whether to re-schedule undecoded UL TBs or not by means of a Early-HARQ (E-HARD) mechanism/function. Using such E-HARQ mechanism/function, UL-Data DSP workers can decode UL data even when hard constraints are violated, since the E-HARQ function predicts the decodability of the data based on the availability of computing capacity and the decoding state of each DSP job at a fixed time $\phi$. In this way, it is possible to have as many UL-Data DSP workers as needed, without a pipeline depth limit to exploit multi-core platforms more efficiently.

Given the decision on a possible re-scheduling of undecoded UL TBs and the actual amount of TBs that the DL-DSP workers managed to encode on time, the final UL/DL grants are computed by the MAC scheduler. In the worst case, where no worker provided valuable output, no grants are allocated and the SF becomes an MVSF.

If DL grants are given, the encoded data is modulated and mapped into the time/frequency resource grid.

All the remaining control channels are processed and subframe n+M is sent for IFFT and transmission over the air.

There are several ways of designing and further developing the teaching of the present invention in an advantageous way. To this end it is to be referred to the dependent claims on the one hand and to the following explanation of preferred embodiments of the invention by way of example, illustrated by the drawings on the other hand. In connection with the explanation of the preferred embodiments of the invention by the aid of the drawings, generally preferred embodiments and further developments of the teaching will be explained.

4G LTE and 5G NR (NR) PHYs have a number of similarities. Therefore, before describing embodiments of the invention in detail, first, the most important aspects of 4G LTE and 5G New Radio that are relevant for at least some embodiments of the invention and that will probably ease their understanding, are introduced and the key insufficiencies of a legacy pipeline will be outlined. A more detailed description of the respective technology can be obtained from Erik Dahlman, Stefan Parkvall, and Johan Skold. 2018.5G NR: "The next generation wireless access technology", Academic Press and references therein.

5G NR adopts orthogonal frequency division multiplexing access (OFDMA) with cyclic prefix (CP) for both downlink (DL) and uplink (UL) transmissions, which enables fine-grained scheduling and multiple-input multiple-output (MIMO) techniques. While LTE also adopts OFDM in the DL, it relies on single-carrier FDMA (SC-FDMA) for the UL, a linearly precoded flavor of OFDMA that reduces peak-to-average power ratio in mobile terminals. The numerology differs between LTE and NR. In both cases, a subframe (SF) consists of a transmission time interval (TTI) that lasts 1 ms, and a frame aggregates 10 SFs. LTE has a fixed numerology with inter-subcarrier spacing equal to 15 kHz, and a SF being composed of 2 slots, each with 7 (with normal CP) or 6 (with extended CP) OFDM symbols. In contrast, NR allows different numerologies, with tunable subcarrier spacing between 15 and 240 KHz. To support this, NR divides each SF into one or more slots, each with 14 (with normal CP) or 12 (with extended CP) OFDM symbols. Finally, LTE supports different bandwidth configurations, up to 20 MHz, whereas NR allows up to 100 MHz in sub-6 GHz spectrum; and both support carrier aggregation with up to 5 (LTE) or 16 (NR) carriers.

The PHY is organized into channels, which are summarized in Table 1 below, that are multiplexed in time and frequency. Although LTE and NR use mildly different channel formats and time/spectrum allocations, they are conceptually very similar. The unit of transmission is the transport block (TB). Within each TTI, PDSCH and/or PUSCH carries one TB per user (or two, in case of spatial multiplexing with more than four layers in DL) as indicated by PDCCH's Downlink Control Information (DCI), which carries DL and UL resource scheduling information. The size of the TB is variable and depends on the modulation and coding scheme (MCS) used for transmission, which in turn depends on the signal quality, and of course on the state of data buffers. Hybrid automatic repeat request (HARD), combining forward error correction and ARQ, is used for error control. To this end, explicit feedback is received from the users in UL Control Information (UCI) messages carried by PUSCH or PUCCH, and TBs are encoded with low-density parity-check codes (NR) or turbo codes (LTE).

TABLE 1

LTE & NR Channels

Downlink Channels and Signals

| | |
|---|---|
| PDSCH | Physical DL Shared Channel: Carries user data, UE-specific higher-layer information and paging, as indicated in PDCCH. |
| PDCCH | Physical DL Control Channel: Carries resource assignments and UL scheduling grants. |
| PBCH | Physical Broadcast Channel: Carries basic information about the cell, e.g., cell bandwidth. |
| PHICH | (LTE only) Physical HARQ Indicator Channel: Carries UL Hybrid-ARQ feedback. |
| PCFICH | (LTE only) Physical Control Format Indicator Channel: Indicates the format used for PDCCH and PHICH. |
| PSS/SSS | Primary/Secondary Synchronization Signals: Signals used for synchronization and cell identity. |

Uplink Channels and Signals

| | |
|---|---|
| PUSCH | Physical UL Shared Channel: Carries user data as indicated in PDCCH and, optionally, UL feedback. |
| PUCCH | Physical UL Control Channel: Carries UL feedback (HARQ, channel quality, etc.) and scheduling requests. |

Figure 3:
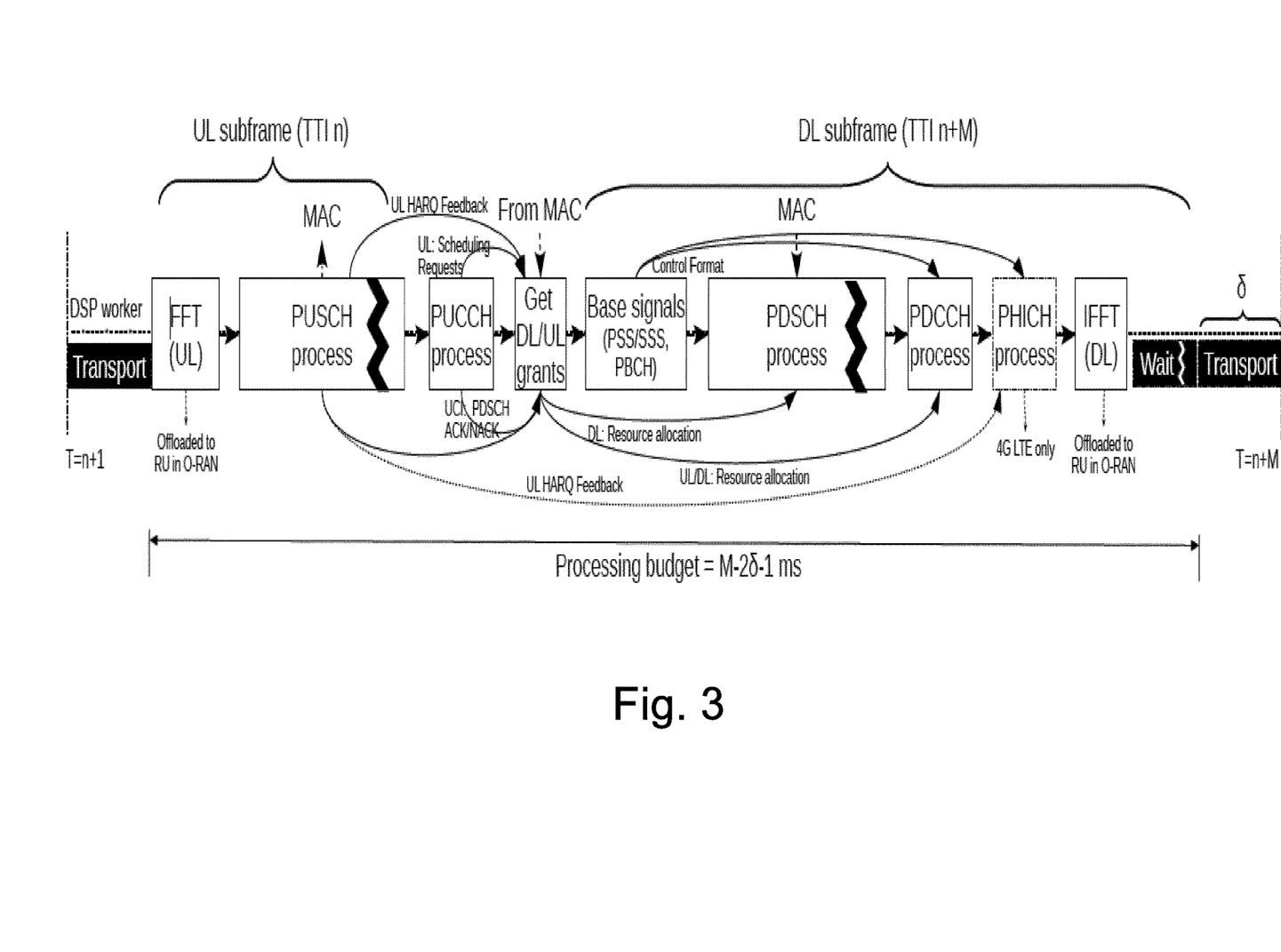
FIG. 3 is a schematic view illustrating a DSP job in a LTE and NR PHY baseline pipeline.

With reference to FIG. 3, details of the baseline design conceptually described in connection with FIG. 2 will be explained hereinafter. Generally, a vPHY processor hosts a set of digital signal processing (DSP) workers, wherein FIG. 3 illustrates a digital signal processing (DSP) job executed by one of such DSP workers. Every TTI n, an idle worker gets a job assignment. The DSP job shown in FIG. 3 comprises the following sequence/pipeline of tasks:

The first task of the pipeline relates to processing uplink subframe n. In this context, first, wireless samples corresponding to the $n^{th}$ UL SF are transformed into OFDM symbols by performing Fast Fourier Transformation (FFT) and CP removal. Here, it should be noted that in O-RAN this task is offloaded to the RU. Then, the PUSCH and PUCCH channels are demodulated, decoded and processed, providing UL TBs (data) and UL feedback (DL HARQ, channel quality, scheduling requests) to the MAC layer.

The next task of the pipeline relates to the computation of UL/DL grants carried by DL SF n+M i.e. resources for DL data and UL requests are scheduled, considering HARQ and channel quality feedback.

Finally, the pipeline includes the task of processing downing subframe n+M. In this regard, first, the base signals are encoded and modulated into the DL SF template, including PSS/SSS, PBCH, and, in case of LTE, PCFICH. Then, the PDSCH (DL TBs) and the PDCCH channels are processed, encoded and modulated, according to the computed grants. Finally, the encoded OFDM symbols corresponding the DL SF n+M are converted into wireless samples by adding CP and performing inverse FFT (IFFT), which are then sent to the radio transmission chain with transportation delay δ.

Figure 4:
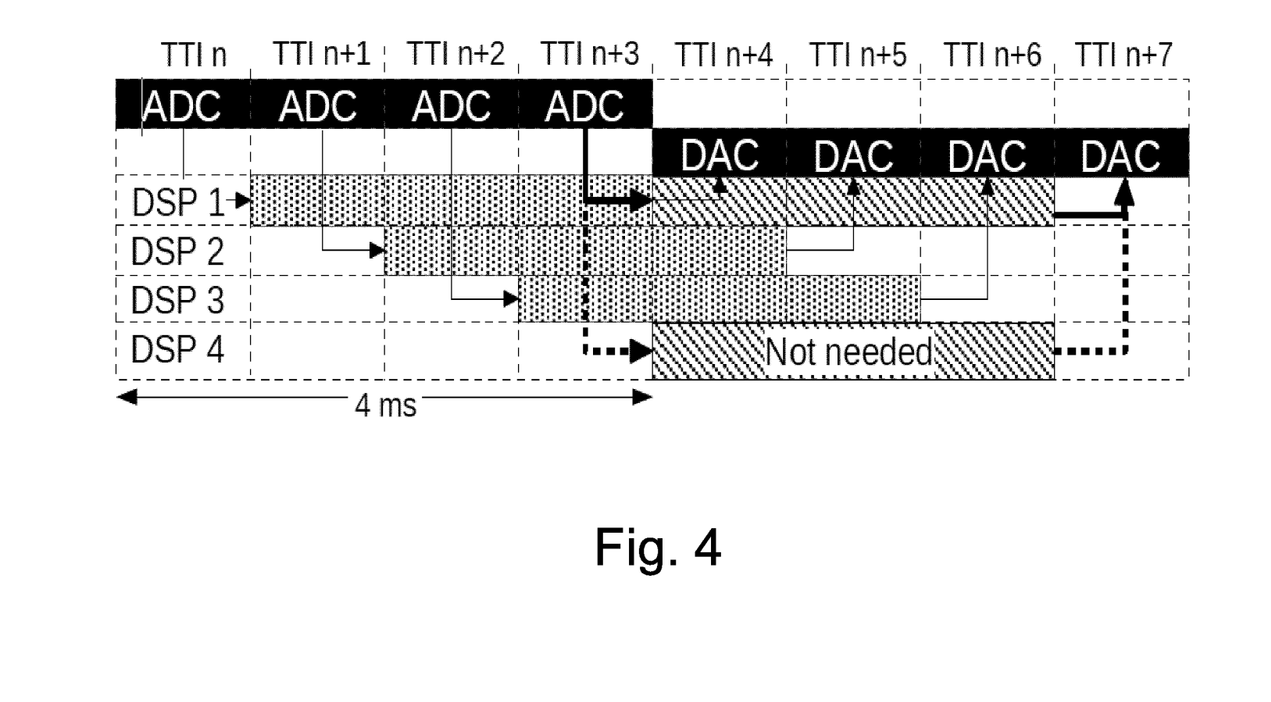
FIG. 4 is a schematic view illustrating a pipeline of multiple DSP jobs.

The choice of M sets a maximum budget of M−2δ−1 ms for each worker to finish a DSP job. This is because DL SF n+M may be delivered to the RU precisely at time n+M. Therefore, this approach enables a maximum pipeline depth of M−1 workers processing DSP jobs in parallel: DSP worker 1 processes DSP job n (i.e., DL SF n and UL SF n+M), worker 2 processes DSP job n+1 (i.e., DL SF n+1 and UL SF n+M+1), and, in general, worker M−1, processes job n+M−2 (i.e., DL SF n+M−2 and UL SF n+2M−2). FIG. 4 schematically illustrates a respective pipeline of multiple DSP jobs for the case of M=4. As can be seen, the job depicted in the hatched area can be processed by DSP 1, making DSP 4 idle and hence, redundant. Therefore, the maximum pipeline depth is three, i.e., three parallel workers.

The legacy vPHY design described above in connection with FIGS. 2-4 is not suited for practical deployments without the assistance of hardware acceleration or aggressive over-dimensioning, which compromise flexibility and cost-efficiency. Namely, this pipeline design fails to address three issues: timing constraints, inter-task dependencies, and head-of-line blocking. In detail:

Timing constraints. PHY operations have tight timing constraints. For instance, LTE's HARQ feedback has a hard time constraint of 4 ms, budgeted for both propagation and processing, which caps the maximum pipeline depth to 3 workers (M=4), as in FIG. 5. Concerning NR vRAPs, there are two constraints relevant for embodiments of the present invention: $K_0$, which denotes the delay between DL allocation (in the PDCCH) and the associated data delivery (within PDSCH); and $K_3$, which denotes the delay between ACK/NACK reception in UL UCI and the corresponding DL re-transmission (PDSCH). Though these timings are tunable in NR, they are configured at longer timescales by the central unit (CU) 110. Differently to LTE, NR has no hard time constraint between PUSCH reception and UL re-transmissions (such timing is referred to as $K_4$ in 3GPP technical discussions, but is not yet included in the specification). However, setting shorter values of M to minimize delay caps the highest pipeline depth and, hence, prevents workers to process long TBs with minimal computing resources. Taking again the case of M=4 in FIG. 5 (which, in practice, is the most common case), each worker has a budget of roughly 3 ms to complete each DSP job.

Inter-task dependencies. Even though decoding operations could be done in parallel to some extent, different PHY processing tasks (such as PDSCH encoding, PUSCH decoding, or PUCCH decoding) are strongly coupled. For instance, DL resource allocations may be computed before actually mapping the PDSCH into the resource grid; all UL TBs in PUSCH may be decoded before computing UL scheduling grants; and so on. As a result, most implementations (e.g., the open-source projects srsLTE (cf. https://www.srslte.com/) and OpenAirInterface (cf. https://www.openairinterface.org/) perform each DSP job in a single-thread pipeline (as described above in connection with FIG. 3) or a multi-thread pipeline where each thread has to wait and be executed in a precise order, which boils down to the scenario of FIG. 4 again. This prevents the use of multi-core systems efficiently to reduce job execution times and improve performance.

Figure 5:
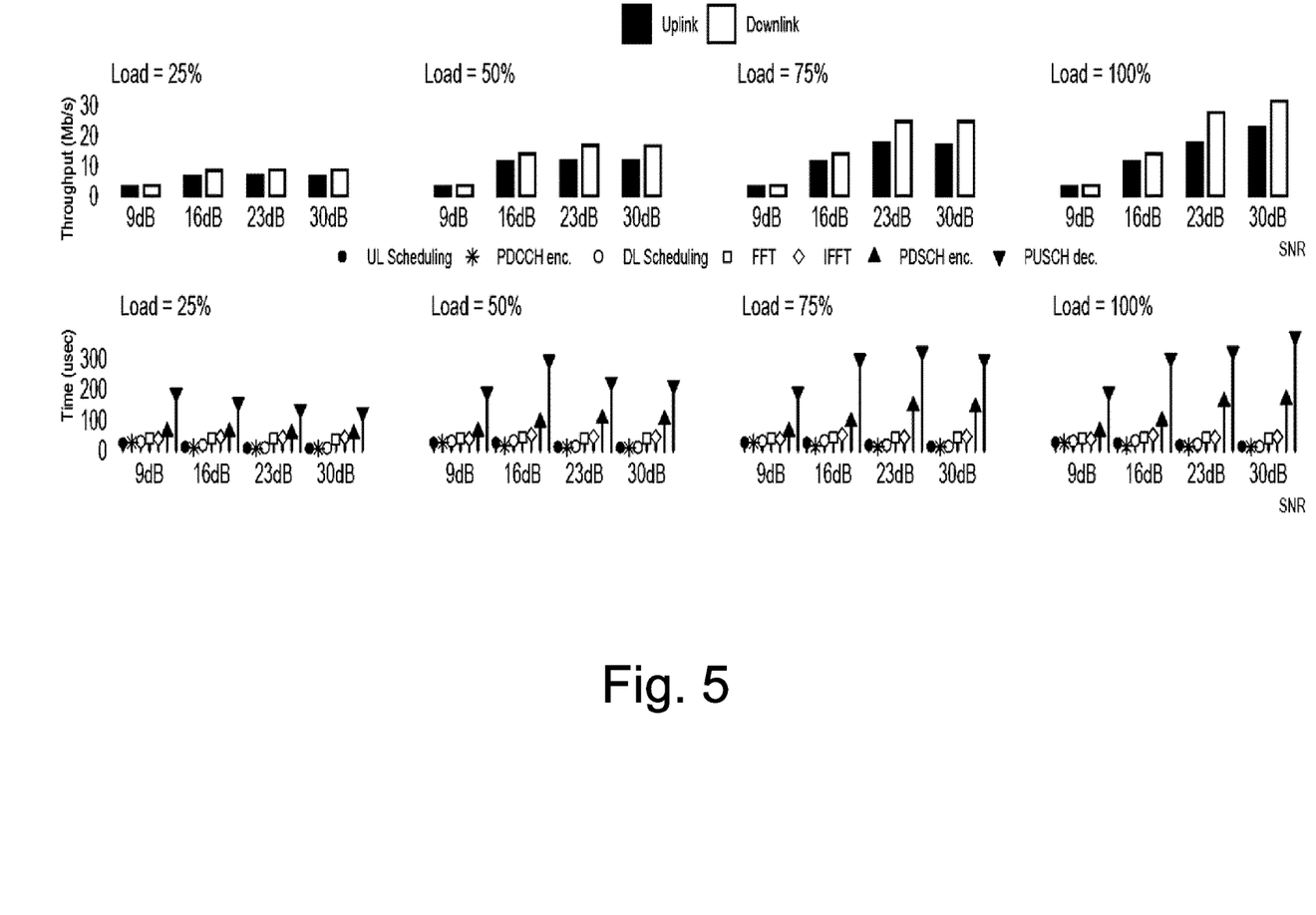
FIG. 5 is a schematic view illustrating throughput performance for both uplink and downlink together with CPU time requirements of different PHY functions in a conventional PHY baseline pipeline.

Head-of-line blocking. The time required by a CPU to process DSP workloads not only depends on the data load (i.e., the rate of TBs to decode/encode) but also on the radio conditions and, hence, on the mobility patterns of the users using the vRAPs. To illustrate this, a toy experiment with srseNB, an open-source LTE eNB stack from srsLTE, processing downlink and uplink traffic over a single-core Intel i7 processor in a 10-MHz band has been set up. FIG. 5 depicts the achieved throughput in both the uplink and downlink, at the top, and the median time incurred by the CPU to perform DSP tasks, at the bottom. These measurements were taken for different load intensities (relative to the capacity in UL and DL, respectively) and different channel conditions, i.e. different average signal-to-noise ratios (SNR), indicating the channel quality for both UL and DL. The results yield two observations. First, encoding TBs for PDSCH and (especially) decoding TBs from PUSCH are the two tasks that consume CPU time the most. Second, while the CPU time of the rest of tasks (and others not shown in FIG. 5 to reduce clutter) remains practically constant, the time required to process PDSCH and PUSCH highly depends on the context; that is, on the SNR—and so on the mobility patterns of the users, and on the load—and hence on the behavior of the users. This gives in to head-of-line blocking and causes unreliability as there is no guarantee that wireless samples encoding a minimally functional subframe will be ready for transmission every TTI (as shown in the baseline pipeline of FIG. 2).

At the moment, there exist two strategies to deal with the aforementioned issues in cloud environments: over dimensioning computing capacity or deploying DSP acceleration hardware. As will be appreciated by those skilled in the art, these two strategies are not ideal as they compromise cost and flexibility, the very reasons NFV is of interest for next-generation RANs in the first place. Moreover, even if hardware acceleration is used a la cloud to offload some PHY tasks such as forward error correction, congestion in the abstraction layer brokering access to the accelerators incur in similar head-of-line blocking issues.

To overcome these issues, embodiments of the present invention provide a novel DSP pipeline design that exploits multi-core general-purpose CPU clouds efficiently to maximize performance and that is resilient to uncertain processing workloads to attain reliability. More specifically, embodiments of the invention provide a DSP processor for 4G/5G vPHYs, due to its characteristic hereinafter sometimes denoted SupplePHY, following two key principles: (i) resiliency in the presence of variable computing capacity and workloads; and (ii) performance by exploiting multi-core CPU clouds efficiently.

Figure 6:
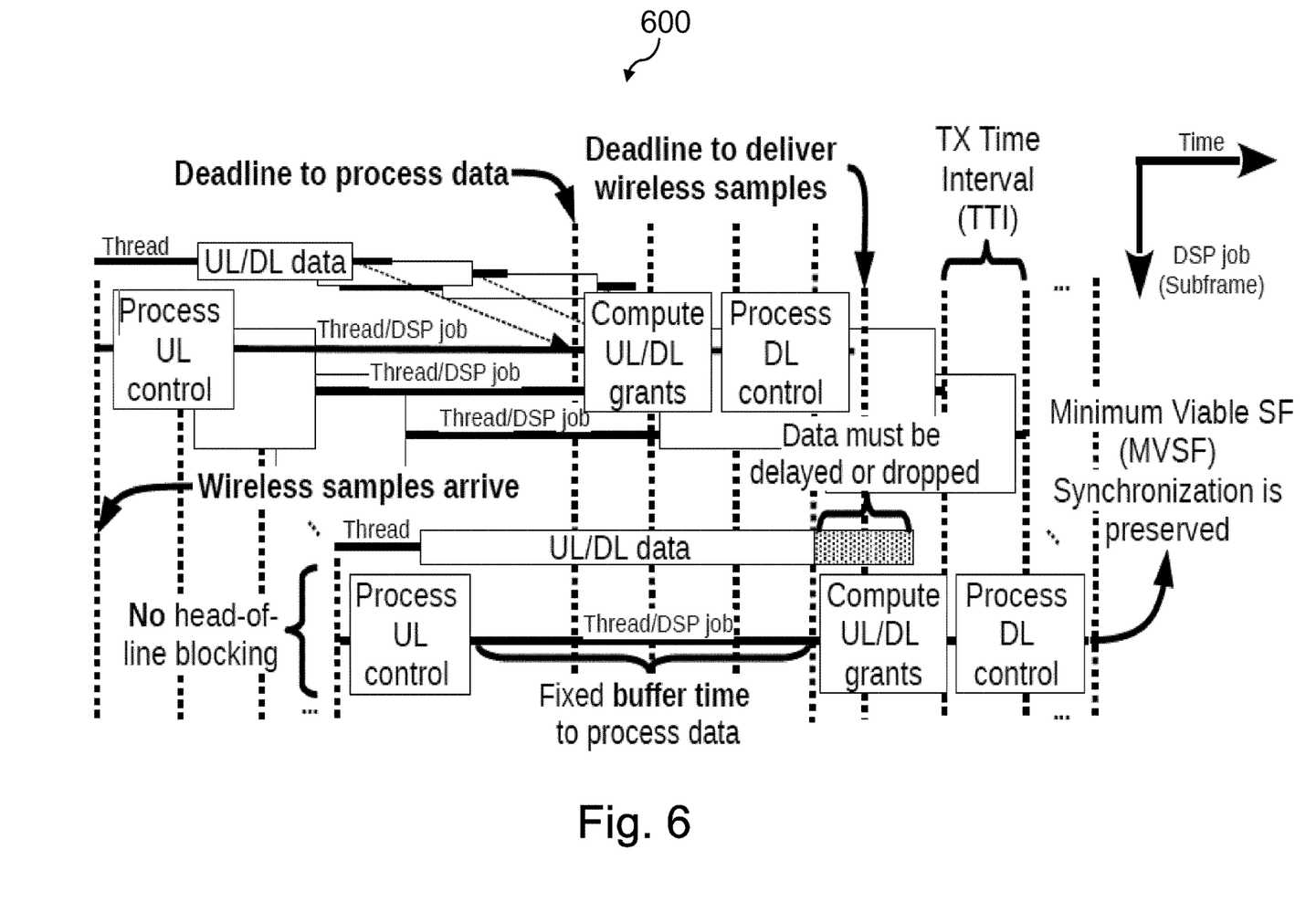
FIG. 6 is a schematic view illustrating the basic concept of a multi-thread PHY pipeline in accordance with an embodiment of the invention.

A multi-thread and resilient DSP pipeline 600 with the processing of one subframe every transmission interval (TTI, 1 ms) is schematically illustrated in FIG. 6. According to this embodiment, the invention leverages on the following three main techniques:
1. Data processing tasks are parallelized with dedicated workers and they are initiated as early as possible in every DSP job (see the upper data thread in FIG. 6;
2. Data workers are granted a fixed time to accomplish their task, but they are terminated upon hard deadlines (see the "Deadline to process data" marks in FIG. 6). This ensures a minimum viable subframe (MVSF) every TTI that preserves synchronization; and
3. Predictors (not shown in FIG. 6) are deployed to initiate DL data processing tasks proactively and/or acknowledge UL data preventively to minimize the amount of idle workers (over-parallelization).

According to embodiments, the present invention provides a DSP pipeline, which is specifically engineered for 4G LTE and 5G NR workloads that are virtualized in general-purpose CPU clouds with constrained and/or variable computing capacity. Specifically, SupplePHY, i.e. the DSP processor for 4G/5G vPHYs, may be designed as a resilient 4G/5G PHY processor that mitigates head-of-line blocking and provides unbounded parallelization, as will be described hereinafter in detail.

Figure 7:
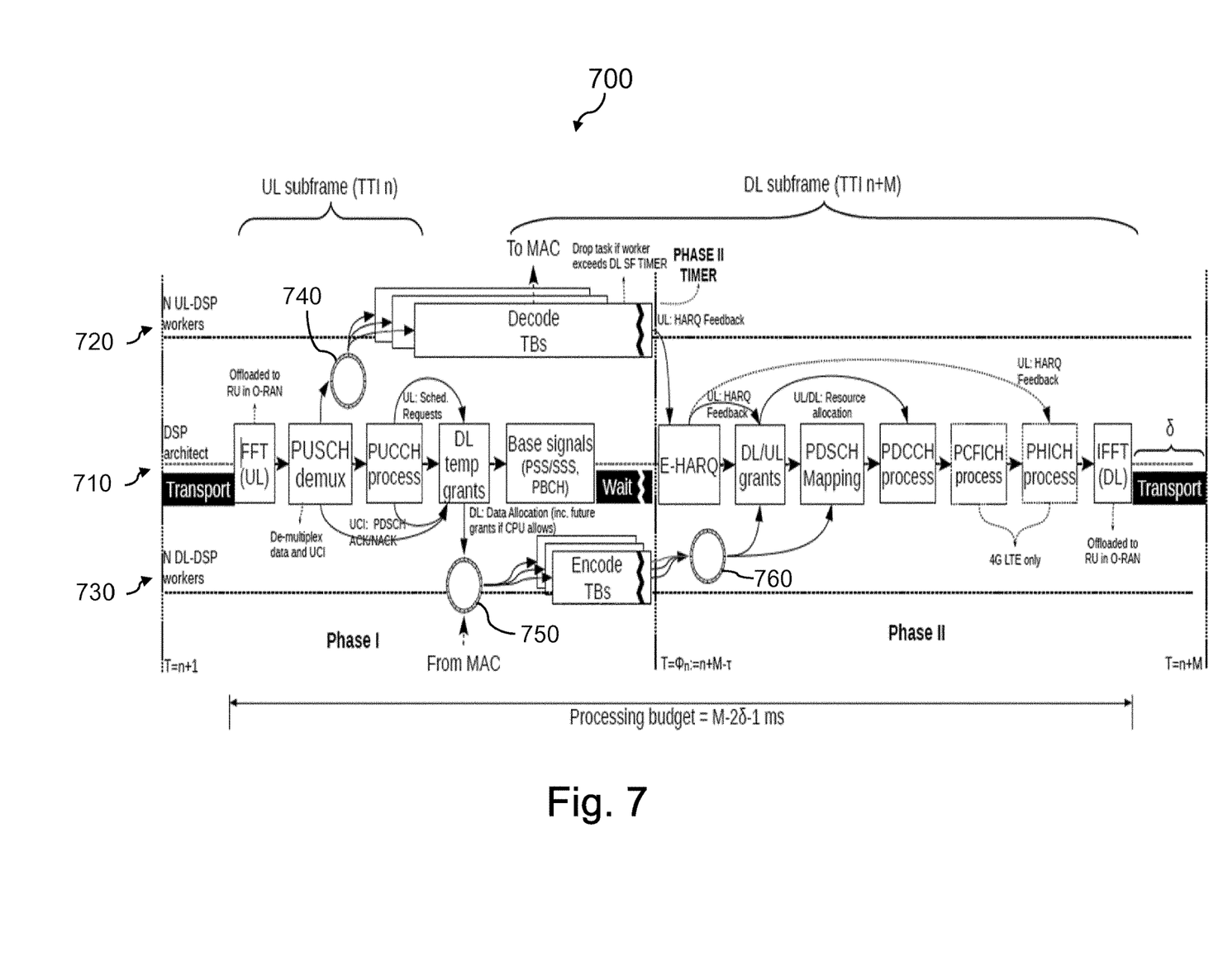
FIG. 7 is a schematic view illustrating operation of a PHY pipeline in accordance with an embodiment of the invention.

In contrast to the baseline design shown in FIG. 3, where each DSP job is handled by a single worker, according to embodiments of the invention the DSP processor may be configured to execute a DSP pipeline 700 that enables a minimum number of three dedicated workers/threads processing different tasks of each DSP job in parallel. According to this configuration, which is schematically illustrated in FIG. 7, the processor may include the following workers/threads:
1. A main DSP worker, denoted DSP architect 710 (see the middle thread in FIG. 7): In an embodiment, this worker may be configured to process one thread that is in charge of (i) performing a minimum subset of tasks, and (ii) coordinating the remaining dedicated DSP job workers that run in parallel. The minimum subset of tasks may be selected to include only those data processing tasks that are computationally cheap and roughly deterministic.
2. At least one UL-Data DSP worker 720 (see the top thread in FIG. 7): In an embodiment, this worker may be configured to process one or more threads in charge of PUSCH decoding tasks.
3. At least one DL-Data DSP worker 730 (see the bottom thread in FIG. 7): In an embodiment, this worker may be configured to process one or more threads in charge of the bulk of PDSCH processing tasks.

Decoupling DSP tasks in this way increases resiliency and performance, which are key design principles of the DSP pipeline according to embodiments of the invention, but requires additional—yet low-effort—tasks for coordination.

As mentioned above, the DSP architect 710 may be implemented to be relieved from any CPU-consuming data processing tasks in particular from encoding TBs (transport blocks) for PDSCH and decoding TBs from PUSCH. Such decoupling of CPU-consuming data processing tasks effectively washes off head-of-line blocking from other critical control tasks executed by the thread performed by the DSP architect 710. This guarantees (at least) a minimal viable subframe (hereinafter briefly referred to as MVSF) every TTI, which ensures resiliency upon unreliable and constrained cloud computing platforms.

The DSP pipeline design according to the embodiment of FIG. 7 builds upon two observations: (i) the time budget to process each job n, associated with UL SF n and DL SF n+M goes between time n+1+δ and n+M−δ (wherein δ denotes the transportation delay of the radio transmission), making a total budget equal to M—2δ−1 ms; and (ii) there is no advantage in using less budget to complete each job which would simply result in inefficient idle times (cf. the "wait" at the end of the baseline pipeline in FIG. 3).

To make use of the available time budget more efficiently, it may be provided to divide the time budget into two phases, herein denoted Phase I and Phase II, as depicted in FIG. 7. According to an embodiment, both phases may be inter-linked with each other as will be explained hereinafter detail. First, the operation of DSP architect 710 during both phases will be described, followed by a description of the interlinked operations of the UL-DSP worker 720 and the DL-DSP worker 730, respectively.

Dsp Architect 710 Thread

Phase I: In this phase, the most basic tasks to process a received UL SF n and other UL-independent tasks to process a corresponding DL SF n+M are performed by the DSP architect 710 as soon as wireless samples arrive at time n+1+δ. In this way, Phase I may comprise the following sequence of tasks:

1. Performing a Fast Fourier Transformation, FFT, in case of Cloud RAN. In case of O-RAN, this task is offloaded to the radio unit, RU.
2. If PUSCH is received, demultiplexing UL TBs from UCI (UL Control Information) and buffering encoded TBs for external processing by a UL-DSP worker, e.g. UL-DSP worker 720, as indicated in FIG. 7 at 740. This aspect will be described in more detail further below.
3. Processing PUCCH/UCI, if present, and encoding base signals (PSS/SSS/PBCH) for the corresponding DL SF n+M.
4. As a novel task, not yet implemented in prior art approaches, computing temporary DL grants for the corresponding DL SF n+M and, possibly, n+M+1, n+M+2, ..., which are used by corresponding DL-DSP workers, such as DL-DSP worker 730, to encode TBs for PDSCH. This aspect will be described in more detail further below. These DL grants are only temporary and may be discarded later on depending on the state of the corresponding DL-DSP workers, such as DL-DSP worker 730, in Phase II.
5. As a further novel task, not yet implemented in prior art approaches, snoozing up until time $\phi_n := n+M-\tau$, where $\tau$ is the processing time incurred by Phase II plus transportation delay (δ ms), which can be estimated beforehand. This step is paramount to maximize the time budget share used by the dedicated data workers 720, 730 that operate in parallel with the DSP architect 710 and to provide synchronization if any of the dedicated data workers 720, 730 misses its time deadlines.

Phase II: The DSP architect 710 is awaken at time $\phi_n$ to finish up the processing of DL SF n+M For this purpose, the DSP architect 710 has a remaining time budget of τ-δ ms, in which the DSP architect 710 performs the following sequence of tasks:

1. As a novel task, not yet implemented in prior art approaches, the DSP architect 710 performs a specially adapted form of HARQ, denoted Early-HARQ (E-HARQ). In contrast to conventional HARQ processing, E-HARQ is configured to just make a prediction, given the state of the UL-DSP worker 720, as available at the end of phase I, as to whether to re-schedule undecoded UL TBs or not. This aspect will be described in more detail further below.
2. Given the previously made E-HARQ decision regarding a possible re-scheduling of undecoded UL TBs and the actual amount of TBs that the DL-DSP workers 730 managed to encode on time (as will be described later), the final UL/DL grants are computed by the MAC scheduler. In the worst case, i.e. where no DL-DSP worker 730 provided valuable output, no grants are allocated and the SF becomes an MVSF.
2. If DL grants are given/allocated, the encoded data is modulated and mapped into the time/frequency resource grid.
3. Processing all the remaining control channels, as shown in detail in FIG. 7.
4. Performing an Inverse Fast Fourier Transformation, IFFT, in case of Cloud RAN. In case of O-RAN, this task is offloaded to the radio unit, RU.

Dsp Workers 720 and 730

As soon as OFDM symbols arrive, the DSP architect 710 deposits the encoded TBs associated to each UL grant expected for the current TTI n in a ring buffer, as shown at 740 in FIG. 7. UL-DSP workers 720 are assigned TBs/grants in the buffer as long as it remains nonempty, i.e., decoding TBs is the main and only task of UL-DSP workers 720. Similarly, DL-DSP workers 730 are assigned the task of encoding TBs if there is data available at the MAC layer and the corresponding temporary grants are provided by the MAC scheduler, as indicated at 750 in FIG. 7. As shown in FIG. 5, encoding and decoding are not only the most CPU-consuming tasks in the whole pipeline 700, but also the ones with highest uncertainty in the amount of CPU resources they require a priori.

Figure 8:
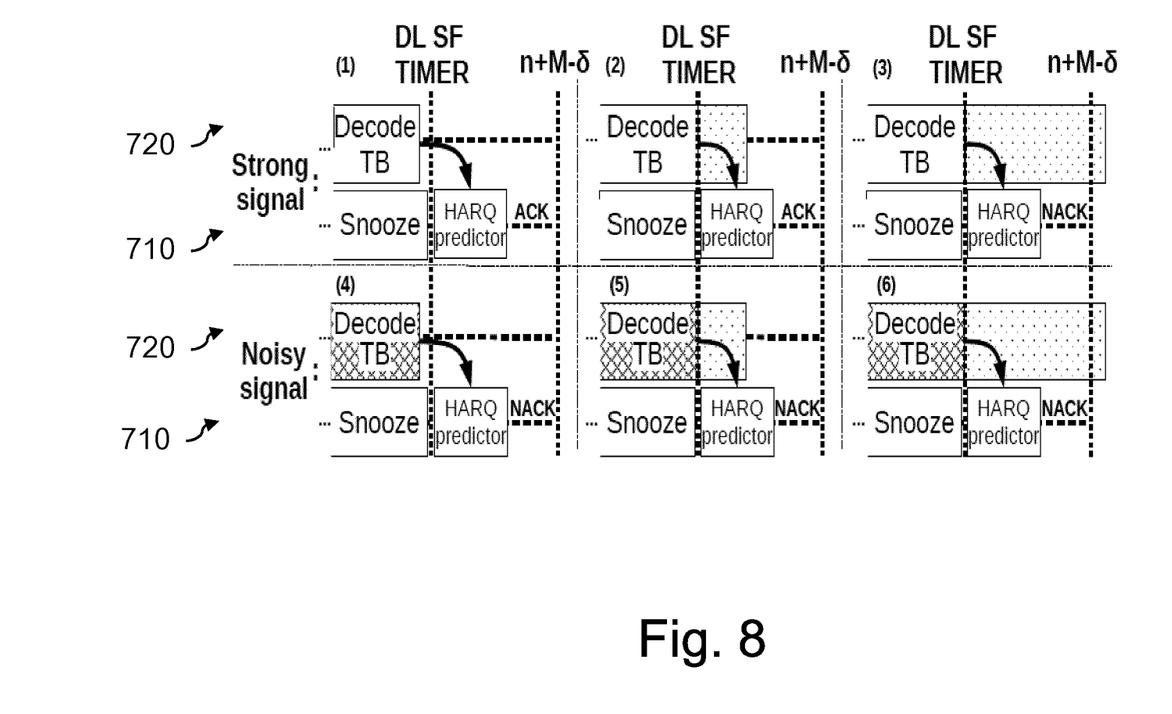
FIG. 8 is a schematic view illustrating operation of a UL-DSP worker in a PHY pipeline of FIG. 7 in accordance with an embodiment of the invention.

In the baseline pipeline of FIG. 3, as described above, data processing causes head-of-line blocking, barring any guarantee to accomplish DSP jobs within the available time budget. Consequently, they are a source of unreliability and poor performance. On the contrary, according to embodiments of the invention the re-engineered pipeline 700 guarantees that there is enough budget to build at least a MVSF that preserves connectivity in the worst case, yet maximizes the budget share for data decoding and encoding tasks. This is the key to maximizing resiliency without compromising performance. As already explained above from the perspective of the DSP architect 710, this is achieved by setting up a deadline at time $\phi_n$, as illustrated in FIG. 7, after which the DSP architect 710 has a guaranteed time budget (that can be estimated beforehand) to harvest the outcome of the UL-DSP and DL-DSP workers 720 and 730. In detail:

UL-DSP worker 720 threads: According to embodiments of the invention, in addition to performing PUSCH decoding and feeding UL data to the MAC layer, the UL-DSP workers 720 are configured to provide feedback to the DSP architect 710 so that grants can be encoded (or not) in SF n+M's PDCCH for UL re-transmissions. As illustrated in FIG. 8, at time $\phi_n$, there are 6 possible outcomes depending on the state of each worker 720 processing TBs for the current SF:

(1) TB is decoded successfully before time $\phi_n$: At time $\phi_n$, E-HARQ signals an ACK to the UL MAC scheduler.
(2) TB can be decoded successfully between $\phi_n$ and n+M−δ: E-HARQ signals an ACK to the UL MAC scheduler.
(3) TB can be decoded successfully after time n+M−δ. At $\phi_n$, E-HARQ signals a NACK to the UL MAC scheduler.
(4) TB is declared undecodable before $\phi_n$: At $\phi_n$, E-HARQ signals a NACK to the UL MAC scheduler.
(5) TB is declared undecodable between $\phi_n$ and n+M−δ: At $\phi_n$, E-HARQ signals a NACK to the UL MAC scheduler.
(6) TB is declared undecodable after time n+M−δ: At $\phi_n$, E-HARQ signals a NACK to the UL MAC scheduler.

As will be appreciated by those skilled in the art, it is of course not possible to design a perfect HARQ predictor. Hence, according to embodiments of the invention the pipeline is designed to be able to deal with a certain (small) number of both false positives, which causes re-transmissions at the RLC layer (extra delay), and false negatives, which cause redundant re-transmissions at the PHY (throughput loss). In this context, it is noted that Early HARQ (E-HARQ) mechanisms have recently been of interest in the context of Ultra-Reliable Low Latency Communication (URLL) communications for 5G. The key idea is to provide feedback on the decodability of the received signal ahead of the end of the actual decoding process.

While prior art proposes E-HARQ mechanisms with the purpose of reducing communication delay, the E-HARQ accommodates fluctuations in workloads or the available computing capacity. To this end, embodiments of the invention simply provide for predicting HARQ feedback at time $\phi$, i.e. when Phase II starts—and not before. To this end, the E-HARQ mechanism according to an embodiment of the invention may integrate two classifiers tasks, including a first classifier, Classifier 1 (C1), that is configured to decide on the decodability of the present TB, and a second classifier, Classifier 2 (C2), that is configured to decide, if C1 is positive, whether the TB will be decoded sometime during Phase II.

Figure 9:
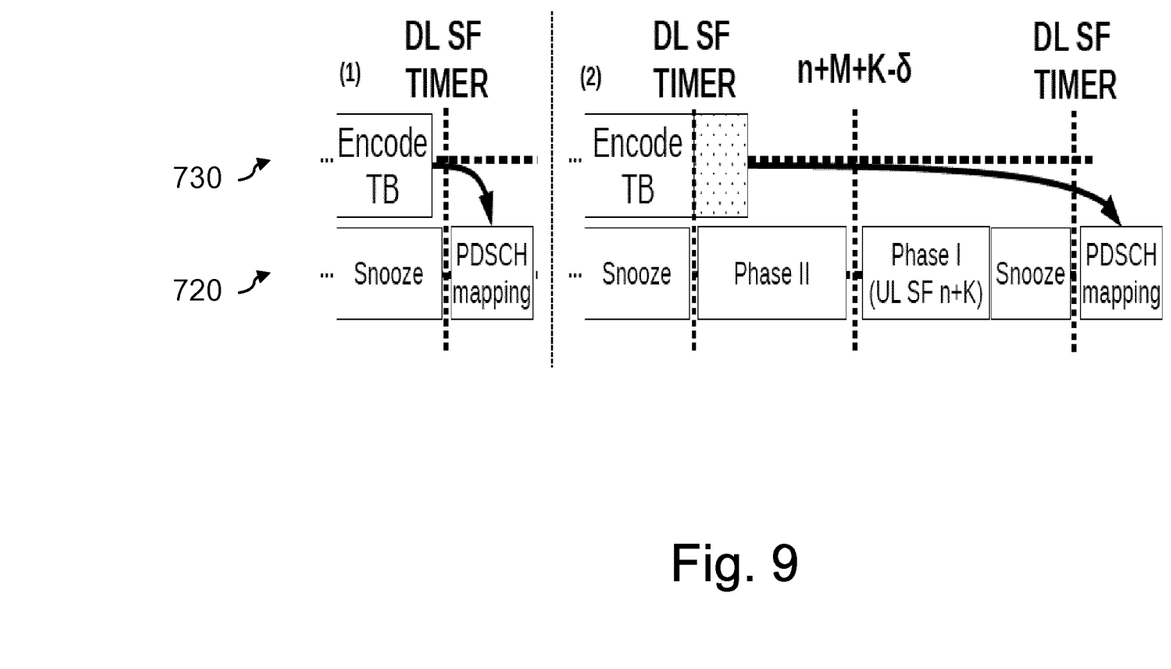
FIG. 9 is a schematic view illustrating operation of a DL-DSP worker in a PHY pipeline of FIG. 7 in accordance with an embodiment of the invention.

DL-DSP worker 730 threads. As already mentioned above, the DL-DSP workers 730 are configured to execute one or more threads in charge of PDSCH processing tasks (as shown at the bottom in FIG. 7). During Phase I, the DSP architect 710 generates temporary grants based upon the availability of data to transmit (just like a regular scheduler) and a prediction on the availability of encoded TBs at the beginning of Phase II. As illustrated in FIG. 9, there are two possible outcomes depending on the state of the DL-DSP workers 730 at time $\phi$:

(1) DL TB is encoded before time $\phi_n$: In this case, the buffer 760 of encoded TBs has data, which is mapped into the current PDSCH.

(2) DL TB is encoded after time $\phi_n$, but before the start of Phase II of a DL SF n+M+K, for some integer K: In this case, the DL TBs temporarily scheduled for DL SF n+M during its Phase I, are now skipped by the scheduler at Phase II. Instead, once the TB is eventually encoded (i.e. within Phase I of UL SF K), that temporary grant is recovered and the TB mapped into the PDSCH in DL SF n+M+K.

By configuring the threads of the DL-DSP workers 730 to create a multi-thread downlink processing pipeline that uses temporary grants, predicting the availability of computing resources and encoding data proactively for successive subframes becomes possible, to minimize idle time in the cloud platform. In this way, it is possible to have as many UL-Data DDSP workers 730 as needed, without a pipeline depth limit to exploit multi-core platforms more efficiently.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a virtualized radio access point (vRAP), the method comprising:
   providing a digital signal processor (DSP) pipeline including a number of DSP workers for execution of a plurality of threads of a physical layer (PHY) of the vRAP, wherein a thread of the plurality of threads comprises a sequence of processing tasks, including at least one of processing an uplink (UL) subframe, performing UL and downlink (DL) resource scheduling and processing a DL subframe; and
   interlinking at least three dedicated DSP workers of the DSP pipeline in such a way that different processing tasks of the thread are executed in parallel, wherein the interlinked at least three dedicated DSP workers include a main DSP worker, a UL data DSP worker, and a DL data DSP worker, wherein the main DSP worker is configured to:
      execute a minimum subset of basic processing tasks to process a received UL subframe;
      execute UL-independent processing tasks to process a corresponding DL subframe; and
      coordinate the UL data DSP worker and the DL data DSP worker.

2. The method according to claim 1, wherein each dedicated DSP worker of the at least three dedicated DSP workers is granted a fixed time period to accomplish its processing tasks and wherein each dedicated DSP worker is terminated upon a hard deadline.

3. The method according to claim 1, wherein the UL data DSP worker is configured to execute one or more processing tasks in charge of decoding transport blocks from PUSCH, and
   wherein the DL data DSP worker is configured to execute one or more processing tasks in charge of encoding transport blocks for PDSCH.

4. The method according to claim 3, wherein a DSP worker of the at least three dedicated DSP workers that is configured to execute processing tasks of a thread (n) associated with the processing of an $n^{th}$ UL subframe of transmission time interval (TTI) n and the corresponding $(n+M)^{th}$ DL subframe of TTI n+M gets assigned a total time budget of M−2δ−1 ms to process the thread, wherein δ denotes a transportation delay associated with radio transmission.

5. The method according to claim 4, further comprising:
   dividing the total time budget into two sequential phases, scheduling the processing tasks of a thread to be executed either within the first or in the second of the two phases, wherein decoding and encoding processing tasks of the UL data DSP worker and of the DL data DSP worker, respectively, are scheduled to be executed within the first phase, determining an endpoint of the first phase based on an estimated processing time incurred with the execution of the processing tasks scheduled to be executed within the second phase, and terminating decoding and encoding data processing tasks of the UL data DSP worker and of the DL data DSP worker, respectively, at the end of the first phase.

6. The method according to claim 5, further comprising:
computing, by the main DSP worker of the at least three dedicated DSP workers during the first phase of the processing of the $n^{th}$ UL subframe of TTI n, temporary DL grants for corresponding $(n+M)^{th}$ DL subframe, using, by the DL data DSP worker, the temporary grants to encode transport blocks for PDSCH, and determining, by the main DSP worker depending on the state of the DL data DSP worker in the second phase, whether to discard the temporary grants or whether to maintain the temporary grants as definitive grants.

7. The method according to claim 5, wherein the main DSP worker of the at least three dedicated DSP workers, after having terminated the execution of processing tasks scheduled to be executed within the first phase, remains idle until the end of the first phase.

8. The method according to claim 5, wherein the main DSP worker of the at least three dedicated DSP workers, at the beginning of the second phase, makes an early-HARQ prediction based on the state of the UL data DSP worker, and wherein the main DSP worker decides on re-scheduling of undecoded UL transport blocks based on the early-HARQ prediction.

9. The method according to claim 8, wherein the early-HARQ prediction is made by an early-HARQ mechanism that integrates two classifiers tasks, including a first classifier to decide on the decodability of a present transport block and a second classifier to decide, based on determining that the first classifier is positive, whether the transport block will be decoded sometime during the second phase.

10. The method according to claim 8, wherein the main DSP worker of the at least three dedicated DSP workers, based on the decision on re-scheduling undecoded UL transport blocks and based on an actual amount of transport blocks that the DL data DSP worker managed to encode within the first phase, computes the final UL/DL grants.

11. The method according to claim 8, wherein, based on that neither the UL data DSP worker nor the DL data DSP worker provided any valuable output until the end of the first phase, the main DSP worker of the at least three dedicated DSP workers does not allocate any UL/DL grants and lets the subframe become a minimum viable subframe, MVSF, in order to preserve synchronization.

12. A virtualized radio access point (vRAP), the vRAP comprising:
a digital signal processor (DSP) pipeline including a number of DSP workers for execution of a plurality of threads of a physical layer (PHY) of the vRAP, wherein a thread of the plurality of threads comprises a sequence of processing tasks, including at least one of processing an uplink (UL) subframe, performing UL and downlink (DL) resource scheduling and processing a DL subframe, wherein at least three dedicated DSP workers of the DSP pipeline are interlinked in such a way that different processing tasks of the thread are executed in parallel, wherein the interlinked at least three dedicated DSP workers include a main DSP worker, a UL data DSP worker, and a DL data DSP worker, wherein the main DSP worker is configured to:
execute a minimum subset of basic processing tasks to process a received UL subframe;
execute UL-independent processing tasks to process a corresponding DL subframe; and
coordinate the UL data DSP worker and the DL data DSP worker.

13. The virtualized radio access point according to claim 12, wherein the DSP pipeline is configured to process 4G LTE or 5G NR workloads in sub 6 GHz frequency bands that are virtualized in general-purpose CPU clouds.

14. A method for operating a virtualized radio access point (vRAP), the method comprising:
providing a digital signal processor (DSP) pipeline including a number of DSP workers for execution of a plurality of threads of a physical layer (PHY) of the vRAP, wherein a thread of the plurality of threads comprises a sequence of processing tasks, including at least one of processing an uplink (UL) subframe, performing UL and downlink (DL) resource scheduling and processing a DL subframe; and interlinking at least three dedicated DSP workers of the DSP pipeline in such a way that different processing tasks of the thread are executed in parallel, wherein a DSP worker of the at least three dedicated DSP workers that is configured to execute processing tasks of a thread (n) associated with the processing of an $n^{th}$ UL subframe of transmission time interval (TTI) n and the corresponding $(n+M)^{th}$ DL subframe of TTI n+M gets assigned a total time budget of M−2δ−1 ms to process the thread, wherein δ denotes a transportation delay associated with radio transmission.

15. The method according to claim 14, wherein the interlinked at least three dedicated DSP workers include a main DSP worker, a UL data DSP worker, and a DL data DSP worker, wherein the method further comprises:
dividing the total time budget into two sequential phases, scheduling the processing tasks of a thread to be executed either within the first or in the second of the two phases, wherein decoding and encoding processing tasks of the UL data DSP worker and of the DL data DSP worker, respectively, are scheduled to be executed within the first phase, determining an endpoint of the first phase based on an estimated processing time incurred with the execution of the processing tasks scheduled to be executed within the second phase, and terminating decoding and encoding data processing tasks of the UL data DSP worker and of the DL data DSP worker, respectively, at the end of the first phase.

16. The method according to claim 15, further comprising:
computing, by the main DSP worker of the at least three dedicated DSP workers during the first phase of the processing of the $n^{th}$ UL subframe of TTI n, temporary DL grants for corresponding $(n+M)^{th}$ DL subframe, using, by the DL data DSP worker, the temporary grants to encode transport blocks for PDSCH, and determining, by the main DSP worker depending on the state of the DL data DSP worker in the second phase, whether to discard the temporary grants or whether to maintain the temporary grants as definitive grants.

17. The method according to claim 15, wherein the main DSP worker of the at least three dedicated DSP workers, after having terminated the execution of processing tasks scheduled to be executed within the first phase, remains idle until the end of the first phase.

18. The method according to claim 15, wherein the main DSP worker of the at least three dedicated DSP workers, at the beginning of the second phase, makes an early-HARQ prediction based on the state of the UL data DSP worker, and wherein the main DSP worker decides on re-scheduling of undecoded UL transport blocks based on the early-HARQ prediction.

* * * * *